3,076,743
FISH CONTROL PROCESS
Wayne E. White, Tulsa, Okla., assignor to Ozark-Mahoning Company, Tulsa, Okla., a corporation of Delaware
No Drawing. Filed Aug. 30, 1960, Ser. No. 52,777
8 Claims. (Cl. 167—46)

This invention relates to methods of controlling fish species populations and refers more particularly to methods of controlling populations of carp and other bottom feeding fish species.

The carp (*Cyprinus carpio*) is a large member of the minnow family closely related to the goldfish. Carp were established in the United States by a Federal stocking program in the 1870's. Commercial fisheries for carp operate in many states, notably Minnesota, Wisconsin, Illinois, Missouri, Michigan, Ohio and New York. Three states (Minnesota, Wisconsin and Iowa) have been engaged in intensive carp control operations for many years. While the relationship between carp and other fish and between carp control and the resulting effect on game and pan species are poorly understood at present, Wisconsin control efforts have been based upon the assumption that carp are harmful when overabundant but harmless when present in moderate numbers only. Carp are present in many waters in which fishing is good and vegetation is abundant, but the fish is apparently capable of destroying gross vegetation in certain waters and may roil the water. Serious food competition may also take place where the carp are overabundant. The carp subsists largely on insects, crustaceans, and molluscs, but some vegetable matter is also taken. Artificial foods such as grains, potatoes, doughballs and other concoctions are relished by carp during the open water season.

Even under the most favorable conditions for commercial operations, commercial fishing does not result in elimination of carp or permanent reduction in numbers. Control by state-employed netting crews, free to operate anywhere at any time, is beset with difficulties. Gill nets are ineffective except under specially favorable conditions, and carp will not readily lead into trap nets in most waters. Poisoning is effective only in small waters and then only if reinfestation cannot occur from connecting waters. The seine, then, remains as the backbone of present day control effects. Unfortunately, the younger fish are not susceptible to seining.

Analysis of Wisconsin catch records (millions of pounds taken annually) has revealed some facts concerning the effect of control upon the carp population itself. No single operation or series of control operations has resulted in permanent control. The first effect of seining, in some waters at least, is an increase of growth rate of the remaining carp, probably due to a lessening of competition. When the adult population is considerably reduced by seining operations, spawn success and/or survival of young carp appears to be favored. In other words, control operations may actually encourage carp abundance, thus necessitating a greater degree of control. Very intensive control operations, may, in certain waters, reduce the reproductive potential.

Thus, it may be concluded that all known methods of carp control which apply mechanical principles are impractical in most waters. On the other hand, poisoning with rotenone has been successful in waters to which carp do not have reaccess. Waters blocked are rare, however, and, usually, all species of fish in a poisoned water are killed.

Therefore, an object of the invention is to develop poisons which will effectively kill carp while harming a minimum number of other forms of aquatic life.

Another object of the invention is to provide carp poisons which are relatively cheap, easy to handle, without danger to the operator, tasty to the carp, capable of dissipation after 48 hours, and able to eradicate most of the carp population in one application.

Another object of the invention is to provide carp poisons with slight water solubility.

Another object of the invention is to provide selective poisoning procedures for carp.

Another object of the invention is to provide poisons for carp which may readily be incorporated in a heavier than water bait whereby one bait would kill a carp.

Another object of the invention is to provide carp poisons which, in the amounts used, would be only a fraction of that necessary for contact poisoning, so little in fact that the compound would not be detected in the treated water by the most sensitive chemical tests known.

Another object of the invention is to provide chemical poisons for carp which may be incorporated in heavier than water baits which will be relatively insoluble in water, stay in the baits and be tasteful to the fish.

Another object of the invention is to provide carp poisons incorporable in heavier than water bait which will not dissolve from the bait as the carp chews it up.

Another object of the invention is to provide processes of reducing and controlling the carp population in areas where more desirable fish are being cultivated.

Another object of the invention is to supply carp poisons to be incorporated in a bait of such over-all density that it will sink to the bottom of a lake where carp will be the principal fish to feed on them.

Other objects of the invention include providing poisons for selective control of fish species other than carp, including other bottom feeders and the like, which may be applied to the species desired to be controlled as previously set forth above.

Other objects of the invention include providing fish poisons contributing to the goal of selective chemical control of all fish species which may be presented to the fish desired to be controlled in various manners, including baits.

Other and further objects of the invention will appear in the course of the following description thereof.

The inventive carp poisons are benzyltrimethylammonium hexafluorophosphate and benzyltrimethylammonium hexafluoroarsenate. The former compound has the following formula:

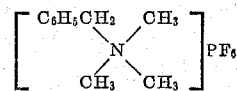

Its molecular weight is 295.22. It comprises 38.6 percent fluorine, 10.5 percent phosphorus and 4.7 percent nitrogen. It has a melting point of 140° C. Melting occurs with decomposition of the salt. The approximate solubilities at room temperature are as follows:

Water_____ 0.4 gm./100 gm. solvent.
Ethanol_____ 0.2.
Acetone_____ 63 (or more).

The salt is insoluble in kerosene, n-hexane, benzene and ether and has at least three interesting properties:
 (1) Its high solubility in acetone;
 (2) The thermal stability of the salt up to its melting point; and
 (3) The fact that the molten salt and its decomposition products cleans some metal surfaces.

The usual purity is over 96 percent with possible impurities of $C_6H_5CH_2(CH_3)_3NCl$ and traces of $HPF_6$.

Benzyltrimethylammonium hexafluoroarsenate has the following formula:

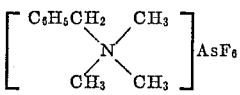

Its molecular weight is 338.9. It comprises 22.1 percent arsenic, 33.7 percent fluorine and 4.1 percent nitrogen. Melting occurs with decomposition of the salt.

In the development of the instant process, many chemical compounds were first tested for solubility in water. Only those with slight solubility were retained for further testing as soluble compounds proved inmpractical for various reasons. Such compounds were then force-fed to carp of various sizes (4 inches to 36 inches in total length) in measured doses. The treated fish were held in 350–550 gallons, glass-fronted, fiberglass tanks at controlled water temperatures ranging from 45° to 85° F. Control fish were used. Symptoms, if any, were noted and expressed as time to sickness and/or death. Compounds which produced no detectable effects were eliminated from further testing. Effective compounds were rechecked upon new fish at different temperatures.

Those compounds which effectively killed fish were introduced into preferred carp foods in measured amounts. The fish were held in the tanks described above at controlled temperatures at which they fed best. Baits which were rejected because of taste or unknown factors were eliminated. At least five fish were used to test the palatability of each compound. Symptoms were observed, and expressed as time to sickness and/or death. Effective baits were retested on new fish at different concentrations of poison and at different temperatures. Control fish were used.

In this above preliminary screening, the size of the dose was determined by the amount which could be packed into two No. 5 gelatin capsules in the case of powders or one capsule in the case of liquids. Some powders being lighter than others, considerable variation was encountered. It was possible to feed no more than two capsules to a single fish. Only one capsule was fed when liquids were tested since speed was of the essence while feeding them. However, all the preliminary doses were large. Results with the instant compounds in successive tests are given below.

In a first test of three experiments involving benzyltrimethylammonium hexafluorophosphate and one carp each, all at a water temperature of 65° F., a first experimental dose of 122 mg./kg., force fed, killed a first carp in 5 hours 50 minutes. A second experimental dose of 120 mg./kg., force fed, caused discomfort symptoms in a second carp within 2 hours 45 minutes and a mortality within 20 hours. A third experimental dosage of 135 mg./kg., force fed, caused discomfort in a third carp within 2 hours 45 minutes and mortality within 5 hours 45 minutes.

In a second test with benzyltrimethylammonium hexafluorophosphate, four separate experiments were involved. The water temperature in each case was 65° F. In experiment No. 1, ten carp were employed with three controls. 9 to 146 mg./kg. were force fed. The ten experimental carp died in from 19 to less than 160 hours. All three controls died in less than 160 hours. This test was of significance because the compound killed the fish with typical symptoms. The death of the controls under the 160 hour limit is not believed to negative the results because the controls died without the typical compound symptoms. Death of the controls was believed caused both by suffocation and a treatment with malachite green.

In the second experiment, eight carp received from 6.5 to 18 mg./kg., force fed, resulting in a mortality of all in less than 19.5 hours. Two carp were force fed 2.5 to 3.5 mg./kg. with no effect within 48 hours. The three controls all died within 19.5 hours. This test was of significance because the compound killed the fish with typical symptoms. The death of the controls under the 19.5 hour limit is not believed to negative the results because the controls died without the typical compound symptoms. Death of the controls was believed caused both by suffocation and a treatment with malachite green.

The third experiment included four carp, force fed 4.6 to 14.6 mg./kg. resulting in mortality to all within from 5 to 7 hours. Two carp were force fed 2.8 and 6.2 mg./kg. with no effect within 48 hours. Two controls showed no effects within 48 hours.

The fourth experiment included two carp force fed 5.54 and 5.6 mg./kg. with mortality within 47 hours. Four carp were force fed 1.8 to 6.4 mg./kg. with no effect within 115 hours. Two controls in this experiment had no effect within 115 hours. At this stage (the conclusion of the second test series) this compound also had killed fish in baits, but the tests were too crude for reporting. Subsequently, carp were killed with baits soaked for 10 hours, the compound also proving to be palatable to the carp.

Since the second test of benzyltrimethylammonium hexafluorophosphate, over one hundred tests were run with the compound variously force fed, injected, in baits, and as a contact poison. All the combined data showed that benzyltrimethylammonium hexafluorophosphate killed at a dose as low as 5 mg./kg. when force fed, at a much lower dose and in minutes when injected, at around 30 mg./kg. when incorporated into baits, and did not kill at five parts per million as a contact poison. These experiments are believed to have great significance.

This compound has also proved to be nontoxic to caddis, flies, snails, crayfish, newts and tadpoles for at least several days at a concentration in water of ten parts per million. It has also proved nontoxic for at least a week to carp, goldfish and gar at a concentration in water of five parts per million.

The $PF_6$ radical is practically inert in a physiological way in respect to warm blooded animals, insects, bacteria, in fact, every kind of animal life known, except the discovered effect on the carp. This is important in several ways. It essentially removes any hazard of preparing the bait. It also makes it possible that the poisoned fish will have a commercial value in the manufacture of cat and dog foods, possibly even human foods, since the chemical agent is nontoxic to such animals.

Turning to experiments involving benzyltrimethylammonium hexafluoroarsenate, in a first test of three experiments involving this compound and one carp each, all at a water temperature of 65° F., a first experimental dose of 153 mg./kg., force fed, killed a carp in less than 21 hours, discomfort shown in 1 hour 45 minutes. A second experimental dose of 123 mg./kg., force fed, caused discomfort syptoms in a second carp within 4 hours 30 minutes and mortality in less than 21 hours. A third experimental dosage of 279 mg./kg., force fed, caused discomfort in a third carp within 1 hour 45 minutes and mortality in 3 hours 45 minutes.

In a second test with benzyltrimethylammonium hexafluoroarsenate, four separate experiments were involved. The water temperature in each case was 65° F. In experiment No. 1, three carp were separately force fed 73, 76 and 78 mg./kg., resulting in all cases in discomfort in 2 hours 45 minutes and mortalities of 27 hours, less than 21 hours and less than 21 hours, respectively.

In the second experiment, involving three carp, they were force fed 42, 52 and 36 mg./kg., respectively, resulting in mortality of less than 20 hours, no effect in 164 hours and mortality of less than 20 hours, respectively.

In the third experiment, involving three carp, they were force fed 6.5, 9 and 6 mg./kg., respectively, resulting in no effect within 120 hours in any of the three cases.

In the fourth experiment, involving three carp, they were fed 18, 28 and 17½ mg./kg., respectively, resulting in no effect within 48 hours in the first two cases, discomfort in 4 hours 15 minutes and mortality within 21 hours in the third case.

In spite of its containing two elements—fluorine and arsenic—commonly associated with high toxicity the hexafluoroarsenate appears to be relatively innocuous. Presumably this is because of the stability of the $AsF_6$-ion which resists hydrolysis to give the more poisonous fluoride and arsenate ions. Tests with webbing clothes moth larvae, milkweed bugs, pea aphids, southern army-worms, Mexican bean beetles and adult German cockroaches showed only the clothes moth larvae to be killed by 0.1 percent solution of a hexafluoroarsenate, $KAsF_6$.

The relative efficacy of the two compounds may be gauged by the relative dosage required per kg. for mortality.

On a weight basis it appears the hexafluorophosphate is considerably more effective than the hexafluoroarsenate as a carp poison. Whereas 5 mg./kg. of the former is frequently fatal when force fed to the fish, four to seven times this much of the hexafluoroarsenate is necessary for frequent fatality.

The two salts are compatible with each other and can therefore be mixed or used singly as poisons, provided the toxic dose level is reach in any case. The dosage ratio above must be taken into account in the mixture. As far as known at present, no synergistic effects are to be expected in the mixtures.

A satisfactory water insoluble bait, usable with both compounds, not intended to be limiting and only as an example comprises a gluten pellet. This bait is acceptable to the fish and for a period of approximately 10 hours. Apparently fermentation takes place so that it is no longer palatable to the carp. The effective lifetime of the chemical agent in the bait is also about 10 hours. During this time enough of this salt will leach out as to make the remaining bait relatively nonpoisonous. Various means of increasing the lifetime of the bait have been considered employing various water repellent agents and binders.

A specific example of a bait fatal to any carp including benzyltrimethylammonium hexafluorophosphate comprises 30 mg. of benzyltrimethylammonium hexafluorophosphate in 3 gms. of gluten.

A specific example of a bait fatal to any carp including benzyltrimethylammonium hexafluoroarsenate comprises 150 mg. of benzyltrimethylammonium hexafluoroarsenate in 3 gms. of gluten.

A specific example of a bait fatal to any carp including a mixture of benzyltrimethylammonium hexafluorophosphate and benzyltrimethylammonium hexafluoroarsenate comprises 15 mg. of benzyltrimethylammonium hexafluorophosphate and 75 mg. of benzyltrimethylammonium hexafluoroarsenate in 3 gms. of gluten.

Carp generally accept corn—dry or in the milky stage, "field" or sweet corn—therefore this is an alternative to the gluten as bait. Dry corn, impregnated so each grain, contains 30 mg. of benzyltrimethylammonium hexafluorophosphate or an equivalent amount of the benzyltrimethylammonium hexafluoroarsenate or mixtures of the two, performs in a manner equal to the bait described. The average weight of dry corn is approximately 350 mg./grain which would require a take up of only 10 percent by weight in the case of the benzyltrimethylammonium hexafluorophosphate alone. Additionally, if corn is employed, as the bait, the accumulation of more than one grain in any carp might very well be expected, in which case a toxic dose per grain might not be required.

From the foregoing it will be seen that this invention is one well adapted to attain all of the ends and objects hereinabove set forth together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth is to be interpreted as illustrative and not in a limiting sense.

Having thus described my invention, I claim:

1. A process of reducing and controlling the carp population in aqueous zones where more desirable fish are being cultivated comprising the step of feeding to the carp lethally toxic doses of one of the class of benzyltrimethylammonium hexafluorophosphate and benzyltrimethylammonium hexafluoroarsenate and mixtures thereof.

2. A process of reducing and controlling the carp population in aqueous zones where more desirable fish are being cultivated comprising feeding to the carp baits containing doses of one of the class of benzyltrimethylammonium hexafluorophosphate and benzyltrimethylammonium hexafluoroarsenate and mixtures thereof, said doses lethally toxic in a limited plurality thereof.

3. A process for poisoning waters containing a carp population comprising adding thereto heavier than water baits containing doses of one of the class of benzyltrimethylammonium hexafluorophosphate and benzyltrimethylammonium hexafluoroarsenate and mixtures thereof, said doses lethally toxic in a limited plurality thereof.

4. A process of reducing the bottom feeding fish population in an aqueous zone comprising seeding the zone with heavier than water baits containing doses of one of the class of benzyltrimethylammonium hexafluorophosphate and benzyltrimethylammonium hexafluoroarsenate and mixtures thereof, said doses lethally toxic to the said bottom feeding fish in a limited plurality thereof.

5. A process of reducing and controlling the bottom feeding fish population in aqueous zones where more desirable fish are being cultivated comprising the step of feeding to the bottom feeding fish species lethally toxic doses of one of the class of benzyltrimethylammonium hexafluorophosphate and benzyltrimethylammonium hexafluoroarsenate and mixtures thereof.

6. A process of reducing and controlling the bottom feeding fish poulation in aqueous zones where more desirable fish are being cultivated comprising feeding to the bottom feeding fish species in said aqueous zone baits containing one of the class of benzyltrimethylammonium hexafluorophosphate and benzylammonium hexafluoroarsenate and mixtures thereof in substantially lethally toxic doses thereof to the said bottom feeding fish population.

7. A process of poisoning waters containing a bottom feeding fish population comprising adding baits thereto heavier than water containing toxic doses of one of the class of benzyltrimethylammonium hexafluorophosphate and benzyltrimethylammonium hexafluoroarsenate and mixtures thereof, said doses lethally toxic to the bottom feeding fish population in a limited plurality thereof.

8. A process of reducing the carp population in an aqueous zone comprising seeding the zone with heavier than water baits containing one of the class of benzyltrimethylammonium hexafluorophosphate and benzyltrimethylammonium hexafluoroarsenate and mixtures thereof in a quantity lethally toxic to an individual carp in a single dose.

References Cited in the file of this patent

UNITED STATES PATENTS

| | | |
|---|---|---|
| 2,385,713 | Koslapoff | Sept. 25, 1945 |
| 2,940,896 | Sprout | June 14, 1960 |